3,211,761
NEW 19-HYDROXY-STEROIDS
Albert Wettstein, Riehen, and Georg Anner, Karl Heusler, and Jaroslav Kalvoda, Basel, and Hellmut Ueberwasser, Riehen, Switzerland, assignors to Ciba Corporation, New York, N.Y., a corporation of Delaware
No Drawing. Filed July 9, 1962, Ser. No. 208,610
Claims priority, application Switzerland, July 14, 1961, 8,269/61; Dec. 29, 1961, 15,168/61
19 Claims. (Cl. 260—397.4)

The present invention provides a special process for the manufacture of $\Delta^{4,6}$-3-oxo-19-hydroxysteroids and of their derivatives.

These new compounds are obtained by treating $\Delta^4$-3-oxo-6$\beta$:19-oxidosteroids with an esterifying or etherifying agent in an anhydrous medium in the presence of a strongly acidic catalyst and splitting any enol ether formed by treatment with an aqueous acid and, if desired, converting any $\Delta^{4,6}$-3-oxo-19-acyloxy-steroid into the $\Delta^{4,6}$-3-oxo-19-hydroxy-steroid.

As starting materials for use in the present process there are suitable $\Delta^4$-3-oxo-6$\beta$:19-oxidosteroids, for instance of the androstane, pregnane, cholane, cholestane, spirostane or cardanolide series which may contain in the cyclic system, more especially in one or several of the positions 1, 2, 7, 8, 9, 11, 12, 14, 15, 16, 17, 20, 21, further substituents such as free or functionally converted oxo groups or esterified or etherified hydroxyl groups, alkyl (for example methyl) groups and/or halogen atoms. The term "functionally converted oxo groups" designates e.g. ketalized oxo groups or oxo groups converted into enol derivatives, for example enolethers or enolesters. The starting materials may further contain additional double bonds, for example in position 16:17 or in the side chain.

Particularly important starting materials are $\Delta^4$-3-oxo-6$\beta$:19-oxido compounds of the androstane or pregnane series, for example $\Delta^4$-3:17-dioxo-6$\beta$:19-oxido-androstene, $\Delta^4$-3-oxo-6$\beta$:19-oxido-17$\beta$-hydroxyandrostene and its esters such, for example, as its acetate, propionate, trimethylacetate, $\beta$-phenylpropionate, decanoate, trifluoroacetate, and the like; $\Delta^4$-3-oxo-6$\beta$:19-oxido-17$\beta$-hydroxy-17$\alpha$-alkyl, -17$\alpha$-alkenyl, -17$\alpha$-alkinyl-androstenes, more especially the 17$\alpha$-methyl, 17$\alpha$-ethyl, 17$\alpha$-isobutyl, 17$\alpha$-butyl, 17$\alpha$-allyl, -17$\alpha$-vinyl, -17$\alpha$-ethinyl, and -17$\alpha$-(2'-methyl)-ethinyl compounds and their esters; furthermore $\Delta^4$-3:20-dioxo-6$\beta$:19-oxido-pregnene, $\Delta^4$-3:20-dioxo-6$\beta$:19-oxido-17$\alpha$-hydroxypregnene and its 17$\alpha$-esters such as its acetate, propionate, trimethylacetate, and the like, and alkyl ethers such, for example, as its 17-methyl, 17-ethyl and 17-benzyl ethers.

The compounds used as starting materials are advantageously prepared by the processes described in Belgian Patents No. 606,179 granted January 15, 1962 to Ciba Société Anonyme and 606,180 granted January 15, 1962 to Ciba Société Anonyme, wherein a 3-oxygenated 19-unsubstituted 6$\beta$-hydroxysteroid is treated with a compound containing a positive halogen, or with an oxidizing heavy-metal acylate such, for example, as lead tetraacetate, and the resulting 3-oxygenated 6$\beta$:19-oxidosteroid is converted in known manner into the corresponding $\Delta^4$-3-oxo-6$\beta$:19-oxidosteroid.

As strongly acidic catalyst there is used in the present process a compound that reacts as a Lewis acid under the reaction conditions, such as concentrated mineral acids and sulfonic acids, for example sulfuric, hydrobromic hydrochloric, para-toluenesulfonic, methanesulfonic acid or the like; equally suitable are boron trifluoride, zinc chloride, tin tetrachloride, titanium tetrachloride, aluminum chloride and similar compounds. The opening of the 6$\beta$:19-ether bridge gives direct rise to derivatives of $\Delta^{4,6}$-3-oxo-19-hydroxy-steroid dienes, or, alternatively, there are obtained intermediates that can be converted into such compounds by treatment with an acid.

Particularly suitable acylating agents are anhydrides and halides of lower aliphatic carboxylic acids, for example acetic, propionic, butyric, pivalic, chloroacetic, trichloroacetic, trifluoroacetic acid or the like. Alternatively, there may be used anhydrous formic acid or a mixed anhydride of formic acid with another acid, for example acetic acid. It is of advantage to use these agents also as solvents.

By using as acylating agent a carboxylic acid anhydride and as acidic catalyst a mineral acid containing oxygen, for example sulfuric, perchloric or a similar acid, or a sulfonic acid, for example para-toluenesulfonic acid, there are obtained from the $\Delta^4$-2-oxo-6$\beta$:19-oxidosteroids directly the $\Delta^{4,6}$-3-oxo-19-acyloxysteroid dienes; these latter compounds are also obtained when the catalyst used is a Lewis acid, more especially boron trifluoride. However, the $\Delta^{4,6}$-3-oxo-19-acyloxysteroid dienes can continue their reaction with acid anhydrides, more especially acetic anhydride and boron trifluoride, and in such a case there are formed boron trifluoride complexes of $\Delta^{4,6}$-3-oxo-2-acyl-19-acyloxy-steroids of the formula

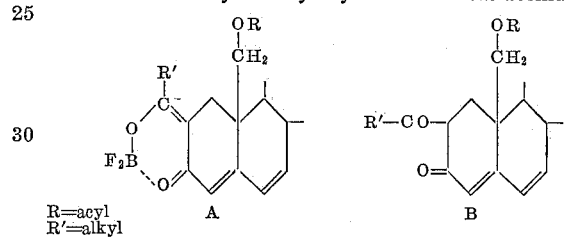

R=acyl
R'=alkyl which can be split under alkaline conditions to the free $\Delta^{4,6}$-3-oxo-2-acyl-19-acyloxy-steroid dienes B and, under energetic treatment with an alkali or an acid, to form 2-unsubstituted $\Delta^{4,6}$-3-oxosteroids. For the cleavage leading to the free 2-acyl compound there are used, for example, basic salts such as sodium acetate or potassium acetate in a suitable solvent, for example in acetic acid, methanol or ethanol, while the elimination of the 2-acyl group is performed with a strong alkali, such as an alkali metal hydroxide or alcoholate, or with a strong acid such as hydrochloric or hydrobromic acid, sulfuric or paratoluene-sulfonic acid.

When an acyl halide (or a mixture of carboxylic acid and acyl halide such as is formed, for example, when an acid anhydride is treated with an anhydrous hydrohalic acid) is used as acylating agent, the reaction of a $\Delta^4$-3-oxo-6$\beta$:19-oxidosteroid yields in the first stage an intermediate containing halogen which in the ultra-violet spectrum displays the absorption of a heteroanular diene. By treatment with an aqueous acid, for example with dilute hydrochloric or sulfuric acid, in dioxane, methanol or ethanol, said intermediate yields the $\Delta^{4,6}$-3-oxo-19-hydroxysteroid diene.

When a $\Delta^4$-3-oxo-6$\beta$:19-oxidosteroid is treated with an acidic catalyst and an etherifying agent, more especially an ortho-ester such as orthoformic acid methyl or ethyl ester, with addition of an anhydrous acid such as paratoluenesulfonic acid or sulfuric acid in an alcohol such as methanol or ethanol, an enolether is formed which can then be split with an aqueous acid to form a $\Delta^{4,6}$-3-oxo-19-hydroxysteroid diene.

In a $\Delta^{4,6}$-3-oxo-19-acyloxy-steroid-diene obtained the 19-acyloxy group can be converted into a free hydroxyl group by a method known per se, e.g. by alkaline or acid hydrolysis, treatment wtih a complex metal hydride, catalytic reduction or the like.

Thus, the present invention provides $\Delta^{4,6}$-3-oxo-19-hydroxysteroid dienes, and esters and ethers thereof, more especially $\Delta^{4:6}$-3-oxo-19-hydroxy compounds of the androstane and pregnane series and esters thereof. Of special value are the following compounds:

$\Delta^{4:6}$-3:17-dioxo-19-hydroxyandrostadiene,
$\Delta^{4:6}$-3:17-dioxo-19-acetoxyandrostadiene,
$\Delta^{4:6}$-3-oxo-17$\beta$:19-dihydroxyandrostadiene,
$\Delta^{4:6}$-3-oxo-17$\alpha$-methyl-17$\beta$:19-dihydroxy-androstadiene,
$\Delta^{4:6}$-3:20-dioxo-19-hydroxypregnadiene,
$\Delta^{4:6}$-3:20-dioxo-17$\alpha$:19-dihydroxypregnadiene, and their 17-mono- or 19-monoesters and 17, 19-diesters, more especially their 19-formates, 19-acetates, 19-propionates, 19-trichloro-acetates, decanoates, phenylpropionates, caproates, 19-trifluoroacetates and the like, e.g.
$\Delta^{4:6}$-3-oxo-17$\beta$:19-diacetoxyandrostadiene,
$\Delta^{4:6}$-3:20-dioxo-17$\alpha$-acetoxy-19-hydroxypregnadiene,
$\Delta^{4:6}$-3:20-dioxo-17$\alpha$:19-diacetoxypregnadiene.

The final products obtained may also be $\Delta^{4:6}$-3-oxo-2-acyl-19-hydroxysteroid dienes and their esters and borofluoride complexes, more especially 2-acetyl compounds. As specific compounds there may be mentioned:

$\Delta^{4:6}$-2-acetyl-3-17-dioxo-19-hydroxyandrostadiene,
$\Delta^{4:6}$-3-oxo-2-acetyl-17$\beta$,19-dihydroxy-androstadiene,
$\Delta^{4:6}$-3-oxo-2-acetyl-17$\alpha$-methyl-17$\beta$,19-dihydroxy-androstadiene,
$\Delta^{4:6}$-2-acetyl-3:20-dioxo-19-hydroxypregnadiene and
$\Delta^{4:6}$-2-acetyl-3:20-dioxo-17$\alpha$:19-dihydroxy - pregnadiene,
and their esters and boron fluoride complexes.

In the esters the acid residues can be e.g. of saturated or unsaturated aliphatic, cycloaliphatic, aromatic or heterocyclic carboxylic acids, preferably of lower aliphatic, monocyclic cycloaliphatic, aromatic or heterocyclic carboxylic acids, lower monocyclic araliphatic or cycloaliphatic carboxylic acids, containing 1–20 carbon atoms, such as, for example, of trimethylacetic acid, acetic acid, propionic acid, butyric acids, valeric acids such as n-valeric acid, caproic acids such as $\beta$-trimethyl-propionic acid, oenanthic, caprylic, pelargonic, capric, undecylic acids, for example undecylenic acid, lauric, myristic, palmitic or stearic acids, for example oleic acid, cyclopropyl-, -butyl-, pentyl- or -hexyl-carboxylic acid, cyclopropylmethylcarboxylic acid, cyclobutylmethylcarboxylic acid, cyclopentylethylcarboxylic acid, cyclohexylethylcarboxylic acid, cyclopentyl-, cyclohexyl- or phenyl-acetic acids or -propionic acids, benzoic acid, phenoxyalkane acids, such as phenoxyacetic acid, para-chlorophenoxyacetic acid, 2:4-di-chlorophenoxy-acetic acid, 4-tertiary butylphenoxy-acetic acid, 3-phenoxy-propionic acid, 4-phenoxybutyric acid, furan-2-carboxylic acid, 5-tertiary butyl-furan-2-carboxylic acid, 5-bromo-furan-2-carboxylic acid, of nicotinic acids, $\beta$-keto-carboxylic acids, for example acetoacetic, propionylacetic, butyrylacetic of caprinoylacetic acid, of amino acids such as diethylaminoacetic acid, aspartic acid, of dicarboxylic acids, for example, oxalic, succinic, maleic, glutaric, dimethylglutaric, pimelic, acetonedicarboxylic, acetylene-dicarboxylic, phthalic, tetrahydrophthalic, hexahydrophthalic, endomethylene-tetrahydrophthalic, endomethylene-hexahydrophthalic, endoxy-hexahydrophthalic, endoxy-tetrahydrophthalic, camphoric, cyclopropanedicarboxylic acid, cyclo-butanedicarboxylic acid, diglycollic, ethylenebisglycollic, polyethylenebisglycollic acids, thioglycollic acid, furan-, dihydrofuran- and tetrahydrofuran-dicarboxylic acids, quinolic, cinchomeronic acid, as well as of the polyethylene-glycol monoalkyl ether semiesters of the aforementioned dicarboxylic acids. Instead of from carboxylic acids the residues may be derived from sulfonic acids or from phosphoric, sulfuric or hydrohalic acids.

In the ethers the residues are preferably such as are derived from lower aliphatic alcohols, ethyl alcohols, propyl alcohol etc., or araliphatic alcohols, such as benzyl alcohol or heterocyclic alcohols, such as tetrahydropyranol.

The products of the invention are important intermediates for the manufacture of 19-nor-steroids. Among the 19-nor-steroids those of the androstane and pregnane series are of special significance. Thus, for example, 19-nor-testosterone and its esters are used as anabolic medicaments, while 19-nor-ethinyltestosterone and related compounds are used because of their gestagenic effect. The present process simplifies the industrial production of these substances and enables also new products to be made which have properties similar to those of the aforementioned products; more especially it is suitable for the manufacture of corresponding 6:7 - unsaturated compounds.

The process for the conversion of the $\Delta^{4:6}$-3-oxo-19-hydroxysteroid dienes into $\Delta^{4:6}$-3-oxo-19-nor-steroids has been described in our application Serial No. 208,634, filed July 9, 1962. In that process a $\Delta^{4:6}$-3-oxo-19-hydroxysteroid diene as obtained by the present process is oxidized (for example with chromic acid and sulfuric acid in acetone) to form a $\Delta^{4:6}$-3-oxo-steroid-19 acid, whereupon said acid is decarboxylated by being heated e.g. with alcoholic hydrochloric acid. In the resulting $\Delta^{4:6}$-3-oxo-19-nor-steroid diene thus obtained the 6:7 double bond can be selectively saturated with a mixed catalyst of palladium and strontium carbonate in ethyl acetate, and there are obtained the known 19-nor-steroids mentioned above.

The following examples illustrate the invention.

*Example 1*

A solution of 1.0 gram of $\Delta^4$-3:17-dioxo-6$\beta$:19-oxido-androstene in 10 cc. of acetylchloride is saturated at 0° with hydrochloric gas with exclusion of moisture. The batch is then left to itself for 16 hours, whereupon the dark-colored reaction mixture is stirred into a solution of 10 grams of crystalline sodium acetate in 100 cc. of ice water. The precipitated reaction product is extracted with methylene chloride, and the extracts are washed with dilute sodium bicarbonate solution and with water, dried and evaporated, to yield 1.38 grams of a crude product which contains chloride and displays in the ultra-violet spectrum a maximum at 245 m$\mu$ ($\epsilon$=11050). Infra-red spectrum: bands inter alia at 5.76, 6.10, 6.22, 8.10 and 8.76$\mu$.

A solution of the above crude product in 50 cc. of dioxane is mixed with 20 cc. of concentrated hydrochloric acid and heated for 2 hours at 60° C., then cooled, diluted with 150 cc. of methylene chloride and repeatedly washed with water. The methylene chloride solution is dried and evaporated; the residue displays in the ultra-violet spectrum in addition to an absorption maximum at 256 m$\mu$ a further maximum at 284 m$\mu$. When the crude product is acetylated with pyridine and acetic anhydride and then chromatographed on alumina, it yields $\Delta^{4:6}$-3:17-dioxo-19-acetoxyandrostadiene which on hydrolysis forms $\Delta^{4:6}$-3:17-dioxo-19-hydroxyandrostadiene melting at 198–199° C. (see also Example 14).

*Example 2*

A suspension of 500 mg. of $\Delta^4$-3-oxo-6$\beta$:19-oxido-17$\beta$-acetoxyandrostene in 3.0 cc. of absolute dioxane, 0.6 cc. of orthoformic acid methyl ester and 0.03 cc. of absolute methanol is treated with 0.06 cc. of concentrated sulfuric acid. The reaction mixture is stirred until all has passed into solution, and then left to itself for 3 days at room temperature. The dark-colored reaction solution is then poured into dilute sodium bicarbonate solution and extracted with methylene chloride. The extracts are washed with water, are dried and evaporated and yield 637 mg. of a brown foam; in the infra-red spectrum it displays between 5.95 and 6.5$\mu$ only weak bands at about 6.05 and 6.20$\mu$, but it is characterized by strong bands at 8.90 and 9.57$\mu$. Ultra-violet spectrum: strong maximum at 242 m$\mu$ ($\epsilon$=12400) and a further maximum at 325 m$\mu$ ($\epsilon$=8600) having a shoulder each at 315 and 335 m$\mu$.

The product is a mixture which contains, inter alia, $\Delta^{3:5:7}$-3-methoxy-17β-acetoxy - 19 - hydroxyandrostatriene. When it is treated with acid, as described in Example 1, it yields $\Delta^{4:6}$-3:oxo:17-β-acetoxy-19-hydroxyandrostadiene.

When the reaction described above is discontinued after only 15 hours and the reaction mixture is chromatographed on alumina, it yields an intermediate—the 3:3:5-trimethoxy-6β:19-oxido-17β - acetoxyandrostane—which, after having been crystallized from ether+pentane, melts at 147–150° C. and displays in the infra-red spectrum bands, inter alia, at 5.76μ (acetate), 7.26, 8.08, 8.21, 9.01, 9.16, 9.60 and 9.29μ.

*Example 3*

A solution of 200 mg. of $\Delta^4$-3:17-dioxo-6β:19-oxidoandrostene in 5.0 cc. of acetylbromide is kept for 3 days at room temperature, then evaporated in a water-jet vacuum and the last remnants of acetylbromide are removed by evaporating the batch twice with benzene. Crystallization from ether+petroleum ether yields 90 mg. of an enolacetate containing bromine; in the ultra-violet spectrum it displays an absorption maximum at 246 mμ (ε=20000) and contains in the infra-red spectrum, inter alia, strong bands at 5.76 and 8.10μ and two weak bands at 6.12 and 6.21μ.

*Example 4*

A solution of 108 mg. of $\Delta^4$-3:20-dioxo-6β:19-oxidopregnene in 1 cc. of acetic anhydride is mixed with 0.1 cc. of boron trifluoride etherate and kept for 2 hours at 25° C. The yellowish brown solution is then poured into ice water, the mixture is stirred for 30 minutes and then extracted with ether. The etheral layer is successively washed once with water, twice with ice-cold saturated sodium bicarbonate solution, and twice with water then dried over anhydrous sodium sulfate, and evaporated under vacuum. Yield: 137 mg. of the dark-yellow amorphous boron tri-fluoride complex of $\Delta^{4:6}$-2-acetyl-3:20-dioxo-19-acetoxy-pregnadiene. The infra-red spectrum of the compound contains bands, inter alia, at 5.77, 5.90, 6.03, 6.24, 6.29, 6.62, 7.32, 8.12, 9.60 and 11.30μ.

*Example 5*

100 mg. of the boron trifluoride complex of $\Delta^{4:6}$-2-acetyl-3:20-dioxo-19-acetoxypregnadiene prepared as described in Example 4 are dissolved in 5 cc. of methanol, treated with 10 mg. of potassium carbonate in 0.2 cc. of water, and the yellow solution is kept for 18 hours at 25° C. For working up the reaction mixture is diluted with water, the methanol is extensively evaporated under vacuum, the aqueous residue is taken up in ether, and the ethereal solution is washed with water until the washings run neutral, then dried and evaporated. There are obtained 75 mg. of crude $\Delta^{4:6}$-3:20-dioxo-19-hydroxypregnadiene.

After chromatography on alumina and crystallization from methylene chloride+hexane the compound melts at 176–179° C. Infra-red spectrum: absorption bands, inter alia, at 2.70, 2.85, 5.90, 6.04, 6.20, 6.33, 6.92, 7.23, 7.38, 8.20, 8.35, 9.44 and 11.40μ. Uultra-violet spectrum: Absorption maximum at 284 mμ (ε=22600).

*Example 6*

A solution of 1.0 gram of $\Delta^4$-3:17-dioxo-6β:19-oxidoandrostene in 10 cc. of acetic acid anhydride is treated with 1 cc. of boron trifluoride etherate, and the reaction mixture, which rapidly turns brown, is kept for 1 hour at 25° C., mixed with 1 gram of sodium acetate and poured into ice water and worked up in usual manner with ether+methylene chloride. Yield: 1.20 grams of a brown foam from which on sprinkling with methylene chloride and ether the crystalline borofluoride complex of $\Delta^{4:6}$-2-acetyl-3:17-dioxo-19-acetoxy - androstadiene melting at 235° C. is obtained. Infra-red spectrum: characteristic bands inter alia at 5.77, 6.25, 6.40, 6.62, 7.17, 7.30, 7.45, 8.15, 9.20, 9.50 and 11.26μ. Ultra-violet spectrum: absorption maxima at 252 mμ (ε=5400), 300 mμ (ε=10200), 311 mμ (ε=9000) and 388 mμ (ε=16300).

*Example 7*

1 cc. of borontrifluoride etherate is added dropwise to a solution of 1.0 gram of $\Delta^4$-3:20-dioxo-6:19-oxido-17α-acetoxy-pregnene, in 10 cc. of acetic acid anhydride, whereupon the solution turns dark; it is kept for 2 hours at 25° C. with exclusion of moisture. The reaction mixture is treated with 4 grams of crystalline sodium acetate, poured into ice water, kept for 30 minutes, taken up in ether+methylene chloride, and the organic layer is washed with water, sodium bicarbonate and water, dried, and evaporated under vacuum. The resulting red-colored crude product (1.152 grams) crystallizes on being sprinkled with ether and methylene chloride in the form of dark-yellow crystals. Subsequent recrystallization from ether+methylene chloride yields 526 mg. of the borofluoride complex of $\Delta^{4:6}$-2-acetyl-3:20-dioxo-17α:19-diacetoxypregnadiene which melts at 258° C. Optical rotation $[\alpha]_D = -295°$ C. Ultra-violet spectrum: maxima at 252 mμ (ε=5500), 300 mμ (ε=10200), 313 mμ (ε=9200) and 389 mμ (ε=16500).

The infra-red spectrum of the compound contains absorption bands, inter alia at 5.75, 5.81, 6.25, 6.38, 6.62, 7.18, 7.23, 7.44, 8.18, 9.25, 9.55, 10.32 and 11.37μ.

The mother liquors do not crystallize; on chromatography on alumina of activity II they yield 306 mg. of crystalline $\Delta^{4:6}$ - 3:20 - dioxo-17α:19-diacetoxypregnadiene which, after three recrystallizations from methylene chloride+ether+petroleum ether, melts at 173–175° C. Optical rotation $[\alpha]_D = +34.9°$ C. Ultra-violet spectrum: maximum at 284 mμ (ε=23600). The infra-red spectrum of the compound contains absorption bands at 5.76, 5.82, 6.02, 6.16, 6.29, 7.20, 7.30, 8.16, 8.50, 8.90, 9.25, 10.40, 10.40, 10.65 and 11.40μ

*Example 8*

As described in the preceding examples, 520 mg. of $\Delta^4$ - 3-oxo-6β:19-oxido-17α-methyl-17β-acetoxyandrostene are reacted for 2 hours with 6 cc. of acetic anhydride and 0.6 cc. of boron trifluoride etherate, to yield a mixture of the borofluoride complex of $\Delta^{4:6}$-2-acetyl-3-oxo-17α-methyl - 17β:19 - diacetoxyandrostadiene with $\Delta^{4:6}$-3-oxo-17α-methyl-17β:19-diacetoxy-androstadiene.

*Example 9*

A mixture of 100 mg. of $\Delta^4$-3:20-dioxo-6β:19-oxido-17α-acetoxypregnene, 1 cc. of acetic anhydride and 0.01 cc. of boron trifluoride etherate is kept for 16 hours at 4° C. The brownish yellow reaction solution is mixed with about 100 mg. of sodium acetate, poured into ice water and in the usual manner worked up with ether+methylene chloride 4:1. By subsequent chromatography and crystallization there is obtained from the yellowish crude product a yield of 25–30% of $\Delta^{4:6}$-3:20-dioxo-17α:19-diacetoxypregnadiene melting at 173 to 175° C. which is identical with the product described in Example 7.

*Example 10*

A solution of 50 mg. of the borofluoride complex of $\Delta^{4:6}$ - 2-acetyl-3:20-dioxo-17α:19-diacetoxypregnadiene in 20 cc. of methanol is mixed with a solution of 0.2 gram of crystalline sodium acetate in 5 cc. of water and the whole is refluxed for 90 minutes. 0.5 gram of sodium acetate are added and the solvent is evaporated under vacuum and the residue taken up in water and ether and worked up in usual manner.

There are obtained 44 mg. of the slightly yellowish $\Delta^{4:6}$ - 2 - acetyl - 3:20-dioxo-17α:19-diacetoxypregnadiene which, after one recrystallization from methylene chloride+ether+petroleum ether, melts at 204 to 206° C. with decomposition. Optical rotation $[\alpha]_D = -201.5°$. Ultraviolet maxima at 248 m$\mu$ ($\epsilon$=6150); 288 m$\mu$ ($\epsilon$=13500); 366 m$\mu$ ($\epsilon$=10000).

The infra-red spectrum of the compound contains absorption bands inter alia at 5.75, 5.80, 6.18, 6.35, 7.18, 7.29, 8.12, 8.91, 9.25, 10.36 and 11.36$\mu$.

Example 11

A suspension of 100 mg. of the borofluoride complex of $\Delta^{4:6}$ - 2-acetyl-3:20-dioxo-17$\alpha$:19-diacetoxypregnadiene in 5 cc. of methanol is treated with 0.1 cc. of concentrated hydrochloric acid and 0.5 cc. of water and kept for 72 hours at 25° C. while being periodically shaken. The yellowish reaction solution is then diluted with twice its volume of water, the methanol is extensively evaporated under vacuum and the aqueous suspension extracted with ether, to yield 65 mg. of crude $\Delta^{4:6}$-3:20-dioxo-17$\alpha$-acetoxy-19-hydroxypregnadiene.

The infra-red spectrum of the compound contains bands inter alia at 2.72, 5.77, 5.78, 6.03, 6.20, 6.33, 6.65, 7.30, 7.68, 8.05, 8.25, 8.40, 8.90, 9.52, 9.28, 10.92, and 11.20$\mu$. $\lambda_{max}$: 284 m$\mu$ ($\epsilon$=20800).

Example 12

A solution of 1.0 gram of $\Delta^4$-3:20-dioxo-6$\beta$:19-oxido-17$\alpha$-acetoxypregnene in 10 cc. of acetic anhydride is mixed with 2.0 grams of para-toluenesulfonic acid and kept for 2 hours at 25° C. For working up of the reaction solution it is mixed with 5.0 grams of crystalline sodium acetate and 100 cc. of water and the mixture is extracted with ether. The organic layer is successively washed with water, cold sodium bicarbonate solution and with water, dried and evaporated. Yield: 1.050 grams of a crude product from which by one crystallization from methylene chloride+hexane there are obtained 763 mg. of $\Delta^{4:6}$ - 3:20 - dioxo - 17$\alpha$:19 - diacetoxypregnadiene melting at 166 to 170° C. After having been chromatographed and crystallized the product is pure and melts at 173 to 175° C. and is in every respect identical with the product described in Example 7. By subjecting the mother liquors to chromatography, further amounts of the identical compound can be obtained.

The identical product is also obtained by using 0.3 cc. of concentrated sulfuric acid instead of para-toluenesulfonic acid.

Example 13

To 480 mg. of $\Delta^{4:6}$-3:20-dioxo-17$\alpha$:19-diacetoxypregnadiene dissolved in 65 cc. of methanol there is added a solution of 600 mg. of sodium bicarbonate in 10 cc. of water and the mixture, which contains precipitated solid sodium bicarbonate, is stirred for 18 hours at 25° C. The solid matter is then filtered off, the methanol evaporated under vacuum, and the residue is taken up in ether and water. Working up yields 420 mg. of a crude product which on being sprinkled with ether yields $\Delta^{4:6}$-3:20-dioxo-17$\alpha$-acetoxy-19-hydroxypregnadiene which melts at 199 to 201° C.; its infra-red spectrum displays bands at 2.73, 5.79, 7.87, 6.05, 6.20, 6.30, 7.23, 7.30, 7.38, 8.05, 8.15, 8.90, 9.20, 9.38, 9.50, 10.27 and 11.28$\mu$. Ultra-violet spectrum: $\lambda_{max}$: 284 m$\mu$ ($\epsilon$=23100).

Example 14

1.0 gram of $\Delta^4$-3:17-dioxo-6$\beta$:19-oxidoandrostene is reacted with 2 grams of para-toluenesulfonic acid in 10 cc. of actetic anhydride as described in Example 12 for the corresponding pregnane compound, and then worked up. The resulting crude product (1.10 grams) is dissolved in 50 cc. of methanol, mixed with a solution of 1.0 gram of potassium carbonate in 5 cc. of water, and the whole is kept for 18 hours at 25° C. Conventional working up yields 870 mg. of a compound which is free from acetate and whose infra-red and ultra-violet spectra are as expected. For purification it is dissolved in benzene and chromatographed on 15 times its weight of alumina of activity II. Benzene and a 9:1-mixture of benzene and ethyl acetate elute 520 mg. of $\Delta^{4:6}$-3:17-dioxo-19-hydroxyandrostadiene which, after recrystallization from methylene cloride+ether+petroleum ether, melts at 198 to 199° C.. Optical rotation $[\alpha]_D$=+135°. Ultra-violet spectrum: $\lambda_{max}$: 284 m$\mu$ ($\epsilon$=23500). The infra-red spectrum of the compound contains absorption bands at 2.75, 5.75, 6.02, 6.16, 6.30, 7.10, 7.26, 7.35, 8.20, 8.27, 9.49, 9.70 and 11.38$\mu$.

Example 15

540 mg. of $\Delta^4$-3-oxo-6$\beta$:19-oxido-17$\beta$-hydroxyandrostene-17-phenylpropionate are treated in 6 cc. of acetic anhydride with 1.1 grams of para-toluenesulfonic acid for 3 hours at room temperature. 2.5 grams of crystalline sodium acetate are then added and the reaction mixture is poured into ice water and worked up in the usual manner with a 4:1-mixture of ether and methylene chloride. Yield: 560 mg. of slightly yellowish, crude $\Delta^{4:6}$-3-oxo-17$\beta$-hydroxy-19-acetoxyandrostadiene - 17 - phenylpropionate which is purified by filtration through 15 times its own weight of alumina (in a benzolic solution) and then subjected to partial hydrolysis. For this purpose 300 mg. of the compound are suspended in 10 cc. of methanol, treated with 60 mg. of sodium bicarbonate in 1 cc. of water and the whole is stirred for 20 hours at 25° C. The reaction mixture is diluted with water and extracted with ether. The neutral and dried solution is evaporated under vacuum and yields 268 mg. of $\Delta^{4:6}$-3-oxo-17$\beta$:19-dihydroxyandrostadiene-17-phenylpropionate [$\lambda_{max}$: 284 m$\mu$ ($\epsilon$=20500)] which still contains a small amount of unreacted starting material. Chromatography yields the compound in the pure form. Its infra-red spectrum contains inter alia absorption bands at 2.75, 5.78, 6.02, 6.20 and 6.30$\mu$.

Example 16

By the same process as described in Example 15, the acetate and the decanoate of $\Delta^4$-3-oxo-6$\beta$:19-oxido-17$\beta$-hydroxyandrostene are converted by reaction with twice the amount of para-toluenesulfonic acid in 10 times the amount of acetic anhydride into the $\Delta^{4:6}$-3-oxo-17$\beta$:19-diacetoxyandrostadiene and, respectively, into the 17$\beta$-decanoate of $\Delta^{4:6}$ - 3 - oxo-17$\beta$-hydroxy-19-acetoxyandrostadiene. On hydrolysis with excess methanolic-aqueous potassium carbonate solution the former compound yields $\Delta^{4:6}$-3-oxo - 17$\beta$:19 - dihydroxyandrostadiene. The compound mentioned in the second place can be partially hydrolyzed under the conditions described in Example 15, to produce a yield of 60 to 65% of the 17-$\beta$-decanoate of $\Delta^{4:6}$-3-oxo-17$\beta$:19-dihydroxy-androstadiene.

Example 17

A solution of 15.0 grams of $\Delta^4$ - 3:20 - dioxo - 17$\alpha$-caproyloxy-6$\beta$:19-oxidopregnene and 9.00 grams of para-toluenesulfonic acid in 150 cc. of acetic anhydride is kept for 20 hours at 25° C. The brown reaction batch is then poured over a mixture of 150 grams of ice and 450 cc. of water, stirred for 40 minutes, then taken up in a 5:1-mixture of ether and methylene chloride, washed with 5% sodium hydroxide solution and water until neutral while being cooled with ice, dried, and evaporated. The resulting crude product contains $\Delta^{4:6}$ - 3:20 - dioxo - 17$\alpha$-caproyloxy-19-acetoxy-pregnene; it is dissolved in 1 liter of methanol, mixed with a solution of 22.5 grams of sodium bicarbonate in 260 cc. of water and refluxed for 75 minutes. The cooled reaction mixture is filtered, the filtrate is neutralized with 12 cc. of glacial acetic acid and concentrated under vacuum to about ⅓ its volume. The residue in the flask is then diluted with water, extracted with a mixture of ether and methylene chloride, and the organic layer is washed with a small amount of sodium bicarbonate solution and with water until the washings run neutral, dried and evaporated under vacuum. Yield: 15.4 grams of a yellow foam which is dissolved in 70 cc.

of benzene+ethyl acetate (9:1) and then chromatographed on 20 times its own weight of neutral alumina. Benzene+ethyl acetate (4:1) and (1:1) elute 9.22 grams of pure $\Delta^{4:6}$ - 3:20 - dioxo - 17α-caproyloxy-19-hydroxy-pregnadiene which melts at 148–148.5° C. after one reprecipitation from methylene chloride+ether. The infra-red spectrum of the compound contains absorption bands, inter alia, at 2.80, 5.76, 5.82 (shoulder), 6.01, 6.17, 6.30, 7.40, 9.40 and 11.35μ.

The $\Delta^4$ - 3:20 - dioxo - 17α - caproyloxy-6β:19-oxidopregnene (melting at 128–130° C.) used as starting material is prepared from $\Delta^5$-3β-acetoxy-17α-caproyloxy-20-oxopregnene (melting at 103–104° C.; optical rotation $[\alpha]_D^{25}=61°$) which is obtained by reacting $\Delta^5$-3β-acetoxy-17α-hydroxy-20-oxopregnene with caproic anhydride in pyridine, in the following manner: Addition of hypochlorous acid on to the $\Delta^5$-double bond, furnishes 3β-acetoxy - 5α - chloro-6β-hydroxy-17α-caproyloxy-20-oxopregnene (optical rotation $_1\alpha]_D^{25}=-38°$) which melts at 160–163° C. The latter product is reacted with a compound containing positive iodine (for example with iodine and lead tetraacetate or silver acetate in cyclohexane) or with a heavy-metal acylate having oxidizing action, such as lead tetraacetate, whereupon a high yield of 3β-acetoxy-5α - chloro - 17α-caproyloxy-20-oxo-6β:19-oxidopregnane (melting at 192–194° C.; optical rotation $[\alpha]_D^{25}=-6°$) is obtained. On partial hydrolysis it furnishes 3β-hydroxy-6α - chloro - 17α-caproyloxy-20-oxo-6β:19-oxidopregnane (melting at 168–169° C.) which, in its turn, on oxidation followed by dehydrochlorination furnishes $\Delta^4$-3:20-dioxo-17α-caproyloxy-6β:19-oxidopregnene.

What is claimed is:

1. A compound of the formula

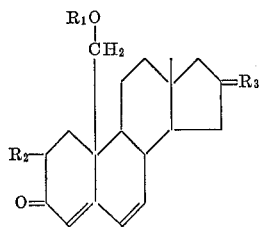

in which each of $R_1$ and $R_2$ stands for a member selected from the group consisting of hydrogen and the acyl radical of a lower aliphatic carboxylic acid, $R_3$ stands for a member selected from the group consisting of =O,

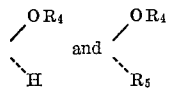

$R_4$ stands for a member selected from the group consisting of hydrogen, the acyl radical of a carboxylic acid and the acyl radical of a sulfonic acid having up to 20 carbon atoms and $R_5$ stands for a member selected from the group consisting of lower alkyl, lower alkenyl and lower alkynyl.

2. A compound of the formula

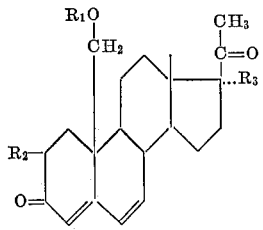

in which each of $R_1$ and $R_2$ stands for a member selected from the group consisting of hydrogen and the acyl radical of a lower aliphatic carboxylic acid, and $R_3$ stands for a member selected from the group consisting of hydroxy, lower alkoxy, monocyclic carbocyclic lower aralkoxy, acyloxy of a carboxylic acid having up to 20 carbon atoms and acyloxy of a sulfonic acid having up to 20 carbon atoms.

3. A compound of the formula shown in claim 1, in which each of $R_1$ and $R_2$ stands for a member selected from the group consisting of hydrogen and acetyl and $R_3$ stands for a member selected from the group consisting of oxo, hydrogen and β-hydroxy, hydrogen and β-acetoxy, hydrogen and β-phenylpropionyloxy, hydrogen and β-decanoyloxy, methyl and β-hydroxy and methyl and β-acetoxy.

4. A compound of the formula shown in claim 2 in which each of $R_1$ and $R_2$ stands for a member selected from the group consisting of hydrogen and acetyl and $R_3$ stands for a member selected from the group consisting of hydroxy, acetoxy and caproyloxy.

5. $\Delta^{4:6}$-3,17-dioxo-19-hydroxy-androstadiene.

6. $\Delta^{4:6}$-3-oxo-17α-methyl-17β:19-diacetoxy - androstadiene.

7. $\Delta^{4:6}$13-oxo-17β:19-dihydroxy-androstadiene.

8. $\Delta^{4:6}$-3:20-dioxo-17α-caproyloxy-19 - hydroxypregnadiene.

9. $\Delta^{4:6}$-2-acetyl-3:20-dioxo-17α,19-dihydroxy - pregnadiene.

10. Process for the manufacture of $\Delta^{4,6}$-3-oxo-19-hydroxy-steroids and their lower aliphatic carboxylic acid esters, wherein a $\Delta^4$-3-oxo-6β:19-oxidosteroid is treated in an anhydrous medium in the presence of a strongly acidic catalyst with a member selected from the group consisting of formic acid, a lower aliphatic carboxylic acid anhydride, a lower aliphatic carboxylic acid halide and a lower alkyl ester of a lower aliphatic orthocarboxylic acid and resulting halogen compounds and 3-enolethers are split by treatment with an aqueous acid.

11. Process as claimed in claim 10, wherein a member selected from the group consisting of acetyl-chloride and acetyl-bromide is used as lower aliphatic carboxylic acid halide.

12. Process as claimed in claim 10, wherein orthoformic acid methyl ester is used as lower alkyl ester of a lower aliphatic orthocarboxylic acid.

13. Process as claimed in claim 10, wherein there is used as strongly acidic catalyst a member selected from the group consisting of a concentrated mineral acid, a concentrated monocyclic carbocyclic aromatic sulfonic acid and boron trifluoride.

14. Process as claimed in claim 13, wherein there is used as the strongly acid catalyst a member selected from the group consisting of boron trifluoride etherate, p-toluene sulfonic acid and sulfuric acid.

15. Process as claimed in claim 10, wherein acetic acid anhydride is used as lower aliphatic carboxylic acid anhydride.

16. Process as claimed in claim 10, wherein the $\Delta^4$-3-oxo-6β:19-oxido-steroid is treated with a lower aliphatic carboxylic acid anhydride and boron trifluoride and the boron trifluoride complex of the corresponding $\Delta^{4:6}$-3-oxo-2-acyl-19-acyloxy-steroid so obtained is split under alkaline conditions to form the free $\Delta^{4:6}$-3-oxo-2-acyl-19-acyloxy-steroid.

17. Process as claimed in claim 16, wherein the $\Delta^{4:6}$-3-oxo-2-acyl-19-acyloxy-steroid formed is treated with a member selected from the group consisting of an alkaline and an acidic agent to form the 2-unsubstituted $\Delta^{4:6}$-3-oxo-19-R-steroid in which R stands for a member selected from the group consisting of hydroxy and acyloxy of a lower aliphatic carboxylic acid.

18. Process as claimed in claim 17, wherein there is used a member selected from the group consisting of hydrochloric, hydrobromic, sulfuric and para-toluenesulfonic acids, an alkali metal hydroxide and an alkali metal alcoholate.

19. $\Delta^{4:6}$-3:20-dioxo-17$\alpha$-acetoxy - 19 - hydroxy-pregnadiene.

References Cited by the Examiner
UNITED STATES PATENTS

| | | | |
|---|---|---|---|
| 2,882,282 | 4/59 | Agnello et al. | 260—397.3 |
| 2,891,079 | 6/59 | Dodson et al. | 260—397.4 |
| 2,969,304 | 1/61 | Wettstein et al. | 195—51 |
| 3,056,807 | 10/62 | Ayer | 260-397.3 |

LEWIS GOTTS, *Primary Examiner.*

UNITED STATES PATENT OFFICE
CERTIFICATE OF CORRECTION

Patent No. 3,211,761            October 12, 1965

Albert Wettstein et al.

It is hereby certified that error appears in the above numbered patent requiring correction and that the said Letters Patent should read as corrected below.

Column 9, lines 35 to 45, the formula should appear as shown below instead of as in the patent:

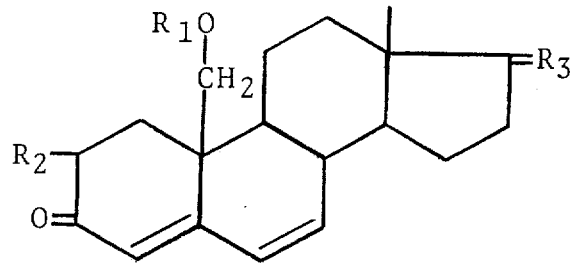

column 10, line 26, for "$\Delta^{4:6}13$-oxo-" read -- $\Delta^{4:6}$-3-oxo- --.

Signed and sealed this 9th day of August 1966.

(SEAL)
Attest:

ERNEST W. SWIDER            EDWARD J. BRENNER
Attesting Officer            Commissioner of Patents